(12) United States Patent
Krumm et al.

(10) Patent No.: US 8,401,771 B2
(45) Date of Patent: Mar. 19, 2013

(54) DISCOVERING POINTS OF INTEREST FROM USERS MAP ANNOTATIONS

(75) Inventors: John C. Krumm, Redmond, WA (US); Lakshmi N. Mummidi, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1244 days.

(21) Appl. No.: 12/177,222

(22) Filed: Jul. 22, 2008

(65) Prior Publication Data
US 2010/0023259 A1 Jan. 28, 2010

(51) Int. Cl.
*G01C 21/30* (2006.01)

(52) U.S. Cl. ........ 701/115; 701/438; 701/447; 701/450; 701/454; 701/483; 340/988; 340/990; 340/995.1; 340/995.12; 340/995.14; 345/634; 715/837

(58) Field of Classification Search ............... 107/200, 107/201, 202, 207, 208, 209, 210, 211, 212, 107/213; 340/988, 990, 995.1, 995.12, 995.14, 340/995.16, 995.24, 995.23, 995.19, 995.27; 707/999.005; 1/1; 345/634; 715/837; 701/426, 701/438, 447, 450, 454, 483, 495, 516

See application file for complete search history.

(56) References Cited

U.S. PATENT DOCUMENTS

| | | | | |
|---|---|---|---|---|
| 5,802,492 A | * | 9/1998 | DeLorme et al. | 455/456.5 |
| 5,948,040 A | * | 9/1999 | DeLorme et al. | 701/201 |
| 6,282,489 B1 | * | 8/2001 | Bellesfield et al. | 701/533 |
| 6,295,502 B1 | * | 9/2001 | Hancock et al. | 701/201 |
| 6,397,208 B1 | | 5/2002 | Lee | |
| 6,993,430 B1 | * | 1/2006 | Bellesfield et al. | 701/533 |
| 6,993,538 B2 | | 1/2006 | Gray | |
| 7,142,217 B2 | | 11/2006 | Howard et al. | |
| 7,783,306 B2 | * | 8/2010 | Wilson et al. | 455/456.3 |
| 7,881,864 B2 | * | 2/2011 | Smith | 701/211 |
| 2003/0093419 A1 | * | 5/2003 | Bangalore et al. | 707/3 |
| 2003/0182052 A1 | * | 9/2003 | DeLorme et al. | 701/201 |
| 2005/0283503 A1 | * | 12/2005 | Hancock et al. | 707/200 |
| 2006/0241859 A1 | | 10/2006 | Kimchi et al. | |
| 2007/0233367 A1 | * | 10/2007 | Chen et al. | 701/207 |
| 2007/0273558 A1 | | 11/2007 | Smith et al. | |
| 2007/0288164 A1 | | 12/2007 | Gordon et al. | |
| 2008/0027632 A1 | | 1/2008 | Mauderer | |
| 2009/0248669 A1 | * | 10/2009 | Shetti et al. | 707/5 |

OTHER PUBLICATIONS

Duda, et al. "Pattern Classification and Scene Analysis" (1973) John Wiley & Sons, Hoboken, NJ.
Iongley, et al. "Geographic Information Systems and Science" (2005) John Wiley & Sons, Hoboken, NJ.
Davis, et al. Mobile Media Metadata for Mobile Imaging http://fusion.sims.berkeley.edu/GarageCinema/pubs/pdf/pdf_65632737-56B8-4083-A465C14A754E6F81.pdf. Last accessed May 16, 2008, 4 pages.

(Continued)

Primary Examiner — McDieunel Marc
(74) Attorney, Agent, or Firm — Hope Baldauff Hartman, LLC

(57) ABSTRACT

The claimed subject matter provides a system and/or a method that facilitates generating a point of interest related to a map. An interface component can collect a portion of annotation data from two or more users, wherein the portion of annotation data is associated with a digital map and includes at least one of a map location and a user specific description of the map location. An annotation aggregator can evaluate annotation data corresponding to the map location on the digital map. The annotation aggregator can create a point of interest (POI) for the map location based upon the evaluation and populates the digital map with at least one of an identified location extracted from two or more users or a universal description extracted from two or more users.

17 Claims, 10 Drawing Sheets

OTHER PUBLICATIONS

Rattenbury, et al. Towards Extracting Flickr Tag Semantics. In: WWW 2007 / Poster Paper, May 8-12, 2007, Banff, Alberta, Canada. ACM 9781595936547/07/0005. http://www.www2007.org/posters/poster909.pdf. Last accessed May 16, 2008, 2 pages.

Krumm. Exploiting Users' Map Annotations. Position Paper for Workshop on Volunteered Geographic Information Dec. 13-14, 2007. http://www.ncgia.ucsb.edu/projects/vgi/docs/position/Krumm_paper.pdf. Last accessed May 16, 2008, 2 pages.

Jaffe, et al. Generating Summaries for Large Collections of Geo-Referenced Photographs. Last accessed May 16, 2008, 1 page.

Goodchild. Citizens as Voluntary Sensors: Spatial Data Infrastructure in the World of Web 2.0. In: International Journal of Spatial Data Infrastructures Research, 2007, vol. 2, 24-32. http://ijsdir.jrc.it/editorials/goodchild.pdf. Last accessed May 15, 2008, 9 pages.

Live Search Map http://maps.live.com/. Last accessed May 15, 2008, 1 page.

Salton, et al. Term-Weighting Approaches in Automatic Text Retrieval. In: Info. Proc. & Man., vol. 24, No. 5, pp. 513-523, 1988. http://www.doc.ic.ac.uk/~jmag/classic/1988.Term-weighting%20approaches%20in%20automatic%20text%20retrieval.pdf. Last accessed May 15, 2008, 11 pages.

Wikimapia http://www.wikimapia.org/. Last accessed May 15, 2008, 1 page.

Ahern, et al. World Explorer: Visualizing Aggregate Data from Unstructured Text in Geo-Referenced Collections. In: JCDL'07, Jun. 18-23, 2007, Vancouver, British Columbia, Canada. ACM 978-1-59593-644-8/07/0006 http://delivery.acm.org/10.1145/1260000/1255177/p1-ahern.pdf?key1=1255177&key2=2063570121&coll=GUIDE&dl=GUIDE&CFID=68013881&CFTOKEN=45121363. Last accessed May 15, 2008, 10 pages.

Rousseeuw, et al. Alternatives to the Median Absolute Deviation. Journal of the Americal Statistical Association, 1993. 88(424): p. 1273-1283. http://web.ipac.caltech.edu/staff/fmasci/home/statistics_refs/BetterThanMAD.pdf. Last accessed Jul. 8, 2008, 11 pages.

Arampatzis, et al. Web-Based Delineation of Imprecise Regions. http://dis.shef.ac.uk/mark/publications/my_papers/CEUS2006.pdf. Last accessed May 15, 2008, 41 pages.

Bulterman. Is it Time for a Moratorium on Metadata? 1070-986X/04 IEEE, Visions and Views, Oct.-Dec. 2004. http://ieeexplore.ieee.org/iel5/93/29587/01343825.pdf?tp=&arnumber=1343825&isnumber=29587. Last accessed May 16, 2008, 8 pages.

Cavens, et al. Image Database Extension to Arcview: How to Find the Photograph You Want http://gis.esri.com/library/userconf/proc01/professional/papers/pap935/p935.htm. Last accessed May 15, 2008, 8 pages.

Davis, et al. From Context to Content: Leveraging Context to Infer Media Metadata. In: MM'04, Oct. 10-16, 2004, New York, New York, USA. ACM 1-58113-000-0/00/0004. http://fusion.sims.berkeley.edu/GarageCinema/pubs/pdf/pdf_63900590-3243-4FA0-845E4BF832AA8BCC.pdf. Last accessed May 15, 2008, 8 pages.

Dubinko, et al. Visualizing Tags over Time. In: WWW 2006, May 23-26, 2006, Edinburgh, Scotland. ACM 1-59593-323-9/06/0005. http://www2006.org/programme/files/pdf/25.pdf. Last accessed May 15, 2008, 10 pages.

Flickr.Com http://www.flickr.com/. Last accessed May 15, 2008, 1 page.

Jaffe, et al. Generating Summaries and Visualization for Large Collections of Geo-Referenced Photographs. In: MIR'06, Oct. 26-27, 2006, Santa Barbara, California, USA. ACM 1-59593-495-2/06/0010. http://www.cs.washington.edu/homes/ajaffe/mir609-jaffe.pdf. Last accessed May 15, 2008, 10 pages.

Jung. Metaviz: Visual Interaction with Geospatial Digital Libraries. Technical Report TR-99-017, Oct. 1999 http://citeseer.ist.psu.edu/cache/papers/cs/12600/ftp:zSzzSzftp.icsi.berkeley.eduzSzpubzSztechreportszSz1999zSztr-99-017.pdf/jung99metaviz.pdf. Last accessed May 15, 2008, 22 pages.

Larson. Geographic Information Retrieval and Spatial Browsing. http://www.ideals.uiuc.edu/bitstream/2142/416/2/Larson.pdf. Last accessed May 15, 2008, 44 pages.

Leclerc, et al. The Geoweb—A New Paradigm for Finding Data on the Web http://www.martinreddy.net/pubs/pdf/icc2001_geoweb.pdf. Last accessed May 16, 2008, 8 pages.

Lim, et al. G-portal: A Map-Based Digital Library for Distributed Geospatial and Georeferenced Resources. In : JCDL'02, Jul. 13-17, 2002, Portland, Oregon, USA. ACM 1-58113-513-0/02/0007. http://citeseer.ist.psu.edu/cache/papers/cs/26722/http:zSzzSzwww.cais.ntu.edu.sg:8000zSz~liuzhzSzpaperszSzjcdl02_overview.pdf/lim02gportal.pdf. Last accessed May 15, 2008, 8 pages.

Marlow, et al. HT06, Tagging Paper, Taxonomy, Flickr, Academic Article, to Read http://www.danah.org/papers/Hypertext2006.pdf. Last accessed May 15, 2008, 9 pages.

Purves, et al. Identifying Imprecise Regions for Geographic Information Retrieval using the Web http://www.dcs.gla.ac.uk/~hideo/pub/gisuk05/gisuk05.pdf. Last accessed May 15, 2008, 4 pages.

Rattenbury, et al. Towards Automatic Extraction of Event and Place Semantics from Flickr Tags. In: SIGIR'07, Jul. 23-27, 2007, Amsterdam, The Netherlands. ACM 978-1-59593-597-7/07/0007 http://yahooresearchberkeley.com/blog/wp-content/uploads/2007/05/sigir2007rattenburyTagSemantics.pdf. Last accessed May 15, 2008, 8 pages.

Schwarz. Estimating the Dimension of a Model. In: The Annala of Statistics, vol. 6, No. 2, pp. 461-464, 1978. http://projecteuclid.org/DPubS/Repository/1.0/Disseminate?view=body&id=pdf_1&handle=euclid.aos/1176344136. Last accessed May 15, 2008, 4 pages.

Shen, et al. Exploring Digital Libraries: Integrating Browsing, Searching, and Visualization. in: JCDL'06, Jun. 11-15, 2006, Chapel Hill, North Carolina, USA. ACM 1-59593-354-09/06/0006. http://ieeexplore.ieee.org/iel5/4119089/4119090/04119091.pdf?tp=&isnumber=&arnumber=4119091. Last accessed May 16, 2008, 10 pages.

Smith. A Digital Library for Geographically Referenced Materials, May 1996. http://ieeexplore.ieee.org/iel1/2/10662/00493457.pdf?arnumber=493457. Last accessed May 16, 2008, 7 pages.

Toyama, et al. Geographic Location Tags on Digital Images. In : MM'03, Nov. 2-8, 2003, Berkeley, California, USA. ACM 1-58113-722-2/03/0011. http://wwmx.org/docs/wwmx_acm2003.pdf. Last accessed May 15, 2008, 11 pages.

Viegas, et al. Visualizing Email Content: Portraying Relationships from Conversational Histories http://www.research.ibm.com/visual/papers/themail_chi_paper.pdf. Last accessed May 15, 2008, 10 pages.

Zhu, et al. Create a Large-Scale Digital Library for Geo-Referenced Information. In : D-Lib Magazine, Jul./Aug. 1999, vol. 5 No. 7/8, ISSN 1082-9873 http://webdoc.sub.gwdg.de/edoc/aw/d-lib/dlib/july99/zhu/07zhu.html. Last accessed May 15, 2008, 14 pages.

* cited by examiner

DISCOVERING POINTS OF INTEREST FROM USERS MAP ANNOTATIONS

BACKGROUND

Technological advances in computer hardware, software and networking have lead to increased demand for electronic information exchange rather than through conventional techniques such as paper correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

In particular, computer-driven route planning or mapping applications are utilized to aid users in locating points of interest, such as particular buildings, addresses, and the like. Additionally, in several existent commercial applications, users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that may be pertinent to the user.

Although mapping software or mapping applications have become an efficient and convenient tool for navigation, maintaining accuracy and up-to-date information for maps can be a daunting task. For instance, information or the maps themselves can include continuously changing information such as areas of road construction, business locations, business names, location addresses, location categories, newly constructed business/home/roads, and the like. Additionally, even with frequent updates, the maps may not be populated with locations or landmarks that are deemed important to users. For example, a large restaurant chain with average food can sponsor the restaurant to be indicated on a mapping application, whereas a smaller family chain with premium reviews and quality may not be listed.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate identifying a point of interest (POI) not previously identified on a map having annotations collected from users. An annotation aggregator can gather annotation data (e.g., portion of text, portion of audio, portion of handwriting, portion of graphic, portion of video, etc.) from two or more users in order to identify a point of interest (POI) for a digital map. The POI can be generated by evaluating user-defined locations and corresponding annotation data. By leveraging user map annotations, digital maps can be enhanced in connection with accuracy and being more current. Additionally, the annotation aggregator can extract a universal description for the identified POI. For instance, by analyzing various users' annotation data for a particular location, a POI can be identified and a label, name, and/or description can be ascertained.

In accordance with another aspect of the subject innovation, the annotation aggregator can utilize a POI evaluator in order to evaluate identified POI. Specifically, the POI evaluator can generate a popularity rank for generated POI. Moreover, the popularity rank for the POI can be implemented as a rendering definition in which POIs can be rendered or displayed based at least in part upon the popularity rank in order to conserve screen real estate and/or reduce map cluttering. In other aspects of the claimed subject matter, methods are provided that facilitate generating a point of interest (POI) with a universal descriptive phrase from map annotations.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
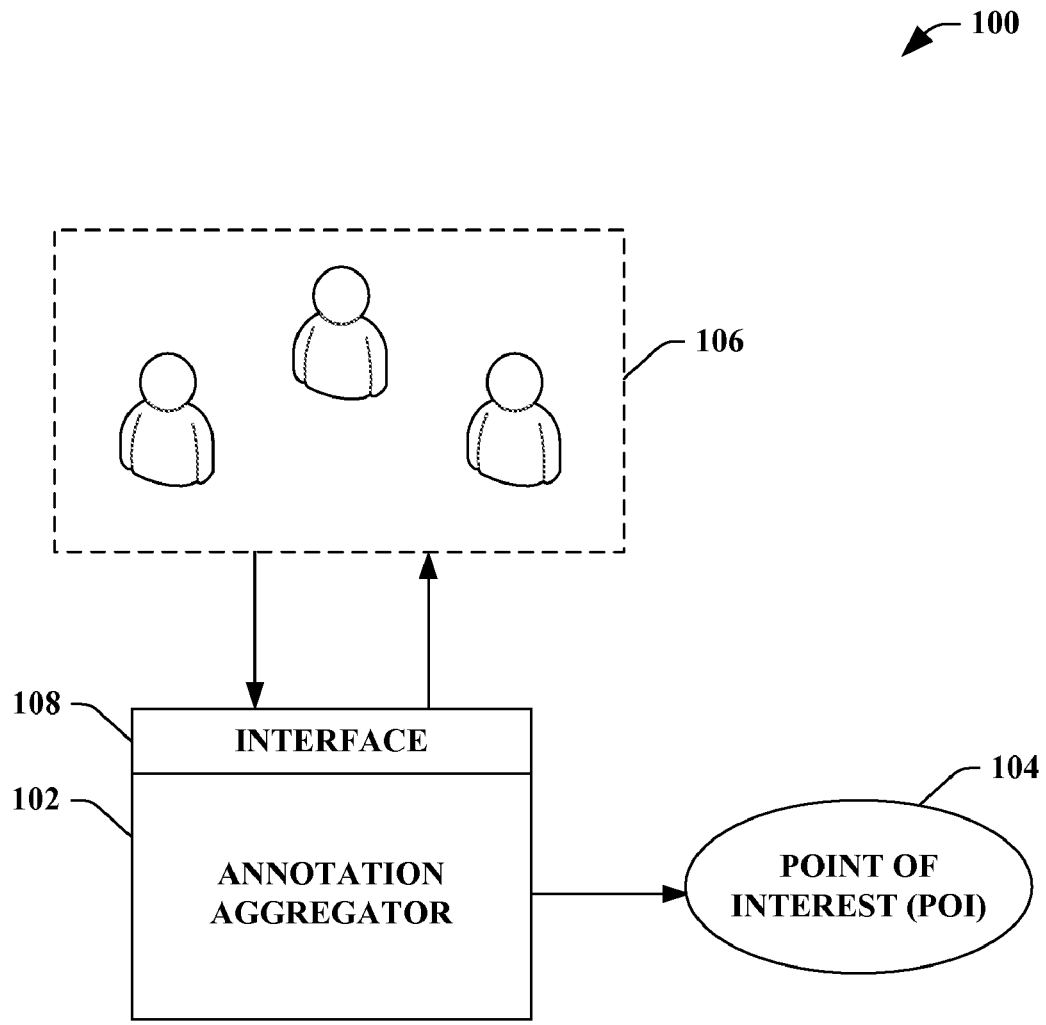
FIG. 1 illustrates a block diagram of an exemplary system that facilitates identifying a point of interest (POI) not previously identified on a map having annotations collected from users.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "aggregator," "evaluator," "component," "system," "data store," "cloud," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates identifying a point of interest (POI) not previously identified on a map having annotations collected from users. The system 100 can include an annotation aggregator 102 that can evaluate annotation data related to a map collected via an interface component 108 from two or more users 106. Based at least in part upon the evaluation of the annotation data from the two or more users 106, the annotation aggregator 102 can generate a point of interest (POI) 104. In particular, the POI 104 can be populated or incorporated into the map at a particular location with an extracted universal description (described in more detail below). For example, the location and/or the extracted universal description of the generated POI 104 can be identified based upon evaluation of the annotation data from the two or more users 106. Moreover, it is to be appreciated that the POI can be existing or new. For ranking POI, pushpins can be used to vote on any PIO (e.g., new POI, existing POI, etc.).

The annotation data collected from the two or more users 106 can be any suitable data related to a map, digital map, online map, or any other suitable map hosted by an entity (e.g., website, network, user, server, data store, database, third-party, company, business, etc.). Moreover, each user within the two or more users 106 can provide or include respective annotation data for distinct locations. Thus, a first user can provide a first set of annotation data for a first location and a second user can provide a second set of annotation data for the first location. The annotation data can be, but is not limited to being, a portion of text, a portion of audio, a portion of video, a portion of a graphic, a portion of handwriting, and/or any other suitable data communication that can be related to a location on a map. For example, a user can annotate a map at a particular address with an audio tag, a video tag, a portion of handwriting, etc. Moreover, it is to be appreciated that the annotation data can be related to a location on a map and include a portion of descriptive data. Additionally, the annotation aggregator 102 can collect the portion of annotation data from at least one of a network, a website, a blog, a network, a device, a mobile device, a smartphone, a tablet pc, a laptop, a desktop computer, a wireless device, and/or any other suitable source that can communicate annotation data for employment with the subject innovation.

For example, a first user can provide a first description (e.g., an annotation, etc.) for a particular location (e.g., "Mexican Food Restaurant" at corner of Main Street and Clark Road in Cleveland, Ohio). A second user can submit a second description at the substantially similar location (e.g., "Mexican Food Eatery" on Main Street in Cleveland, Ohio). The annotation data (e.g., the first description and corresponding location, the second description and corresponding location, etc.) can be evaluated in order to generate a point of interest (POI) that can be incorporated, combined, inserted, overlaid, etc. with a map or digital map. The POI can include a location and/or a description ascertained from the annotation data. In this example, the map can include a POI at the identified location with the description, for instance, "Mexican Food."

In addition, the system 100 can include any suitable and/or necessary interface component 108 (herein referred to as "interface 108"), which provides various adapters, connectors, channels, communication paths, etc. to integrate the annotation aggregator 102 into virtually any operating and/or database system(s) and/or with one another. In addition, the interface 108 can provide various adapters, connectors, channels, communication paths, etc., that provide for interaction with the annotation aggregator 102, the POI 104, the two or more users 106, and any other device and/or component associated with the system 100.

Figure 2:
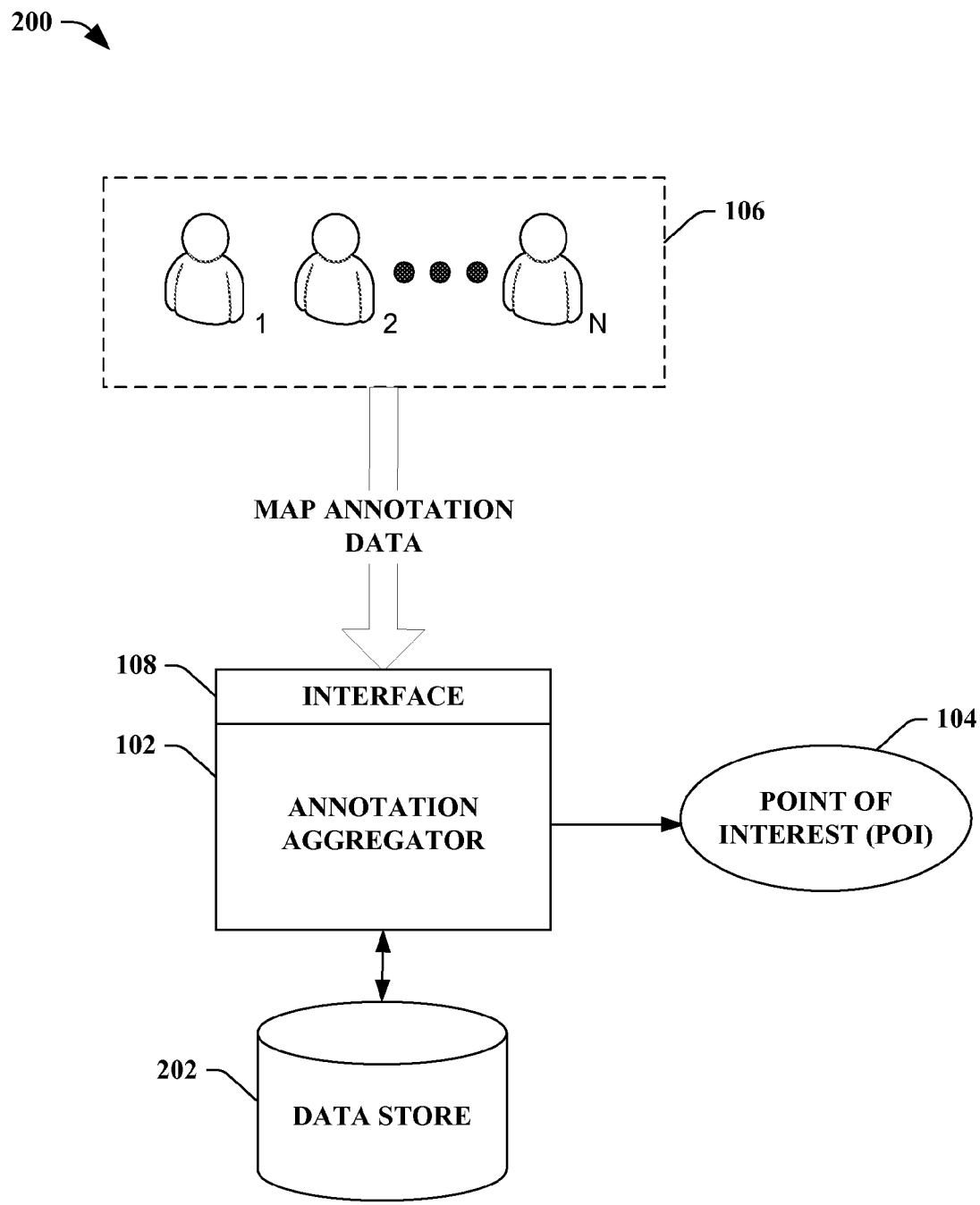
FIG. 2 illustrates a block diagram of an exemplary system that facilitates collecting map annotations from users in order to identify a point of interest (POI).

FIG. 2 illustrates a system 200 that facilitates collecting map annotations from users in order to identify a point of interest (POI). The system 200 can include the annotation aggregator 102 that can generate a POI 104 based upon an evaluation of map annotation data collected from two or more users 106. In general, the system 200 can aggregate various map annotation from a plurality of users in order to identify a point or interest or geographic location with a description that is not identified in at least one of a map, a digital map, a portion of mapping software, a mapping device, a portion of mapping hardware, etc.

It is to be appreciated that the subject innovation can be utilized with any suitable device, component, hardware, software, etc. that can leverage a map or map data. For example, any suitable electronic device that can utilize a map such as, a computer, a laptop, a portable digital assistant (PDA), a smartphone, a media player, a browser, a portable browsing device, a wireless device, a communication device, a media player, a gaming device, a gaming console, a portable gaming device, a wireless communication device, etc. can benefit from the claimed subject matter. In other words, by enhancing maps and/or digital maps with the evaluation of annotation data collected from a plurality of users 106, the efficiency and accuracy of maps are vastly improved.

The system 100 can further include a data store 202 that can include any suitable data utilized and/or accessed by the annotation aggregator 102, the POI 104, the two or more users 106, the interface 108, etc. For example, the data store 202 can include, but not limited to including, map data, maps, digital maps, username, passwords, map annotation data, annotations, locations, longitude/latitude data, global positioning system (GPS) data, clustering data, universal descriptions, pre-defined geographic ranges for clustering, security settings, point of interest (POI) data, annotation submission data (e.g., annotations from which users, etc.), POI evaluation data (e.g., POI interest, POI popularity, POI importance, etc.), time stamp data, etc. Moreover, although the data store 202 is depicted as a stand-alone component, it is to be appreciated that the data store 202 can be a stand-alone component, incorporated into the annotation aggregator 102, and/or any suitable combination thereof.

It is to be appreciated that the data store 202 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 202 of the subject systems and methods is intended to comprise, without being limited to, these and any other suitable types of memory. In addition, it is to be appreciated that the data store 202 can be a server, a database, a hard drive, a pen drive, an external hard drive, a portable hard drive, and the like.

Figure 3:
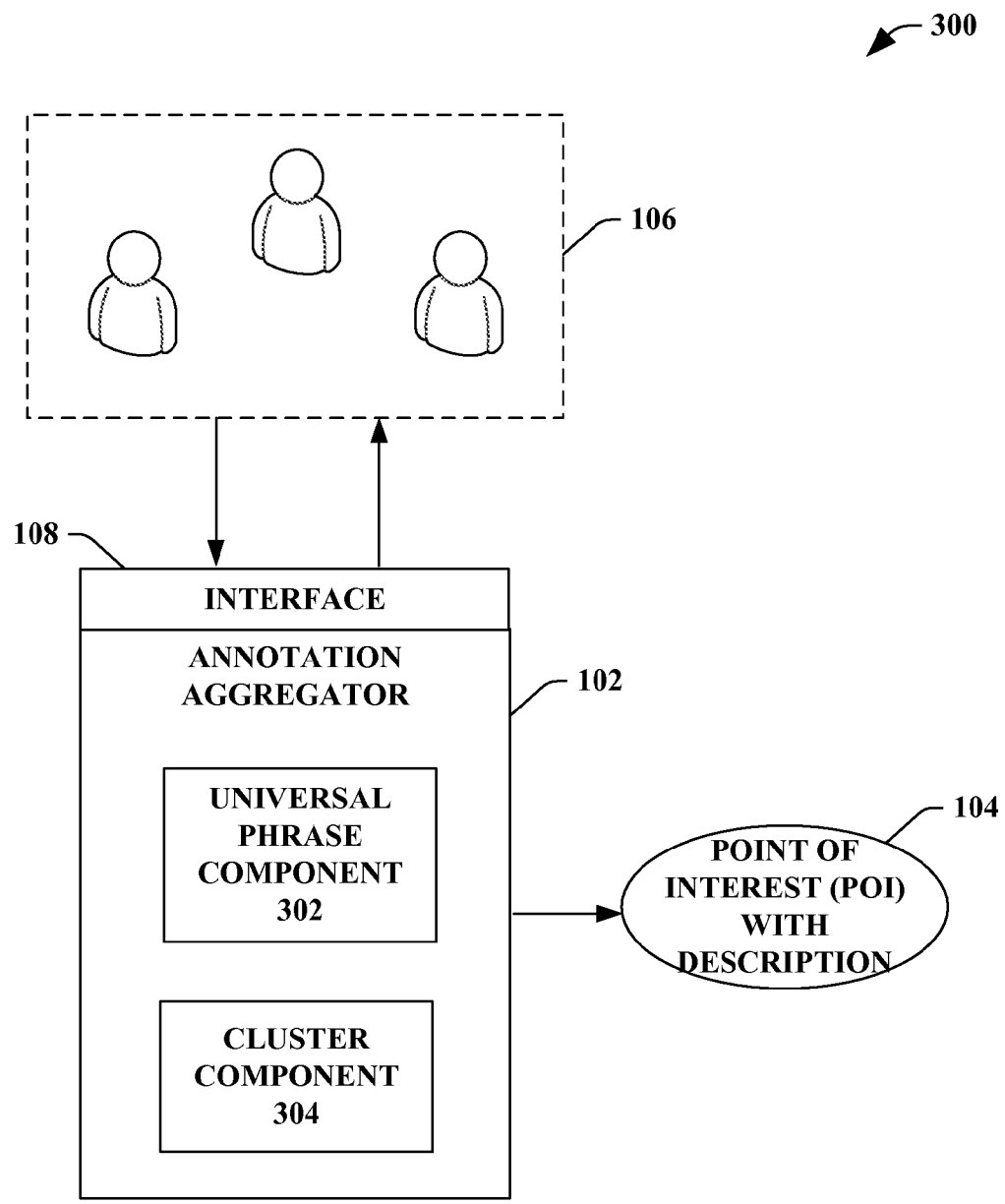
FIG. 3 illustrates a block diagram of an exemplary system that facilitates generating a point of interest (POI) with a universal descriptive phrase from map annotations.

FIG. 3 illustrates a system 300 that facilitates generating a point of interest (POI) with a universal descriptive phrase from map annotations. The system 300 can gather "clean" annotation data from two or more users 106 in order to identify and populate a map with a point of interest (POI) with description 104, wherein "clean" annotation data can be received, verified, and/or authenticated. For example, the annotation data gathered can be verified to be accurate (e.g., location data, annotations corresponding to location, etc.) and from a trusted source (e.g., authorized user submission, virus-free, non-spam, etc.). Moreover, the POI 104 can include a description extracted from the collected annotation data from the two or more users 106 (discussed in more detail below).

For example, the annotation aggregator 102 can extract annotation data such as geographic locations (e.g., pushpins indicated by a user, latitude/longitude data from a device, GPS data, etc.), titles, descriptions, notes, etc. The annotation aggregator 102 can generate a set of text annotations anchored to locations specified by latitude/longitude or other location specific data (e.g., address, GPS data, etc.). The system 300 can further extract candidate or potential POI names/descriptions from the text or annotation data as well as numerical features (e.g., data to increase suitability for incorporation to a map or digital map). For instance, unsuitable candidate phrases (e.g. "area is used") or descriptions can be filtered out. In general, the system 300 can extract candidate or potential labels/phrases/descriptions, wherein such candidates can be referred to as "ngrams." An ngram can be a phrase with "n" amount of words to describe a location in which "n" can be any suitable positive integer. The annotation aggregator 102 can identify ngrams and perform clustering to find groups that are physically compact. The system 300 can further compute numerical features of the ngrams inside each cluster in order to identify suitable ngrams or universal phrases or descriptions.

The annotation aggregator 102 can include a universal phrase component 302 that can evaluate collected annotation data in order to extract a universal phrase or description for the identified POI 104. From each location (e.g., collected location from a user, etc.), the universal phrase component 302 can extract candidate POI phrases from metadata related to the annotation data such as, but not limited to, title, notes, audio, video, text, etc. Specifically, the universal phrase component 302 can extract ngrams for n=1, 2, and 3: monograms, bigrams, and trigrams, respectively. For instance, the description of one location can be "South Mercer Playfields play structure." From this, the universal phrase component 302 can extract the following ngrams: South; Mercer; Playfields; play; structure; South Mercer; Mercer Playfields; Playfields; play; play structure; South Mercer Playfields; Mercer Playfields play; and Playfields play structure. It is to be appreciated that except for computational speed, there is no reason not to consider ngrams with more than three words. In the above example, three ngrams is utilized in order to provide data within a reasonable amount of time.

It is to be appreciated that the extracted ngrams can come from adjacent words in the original text. In other words, the universal phrase component 302 does not construct ngrams that skip over words or text. In one example, the universal phrase component 302 can ignore subtle differences when comparing ngrams such as, but not limited to, the case (upper or lower) of the characters. The universal phrase component 302 can split phrases into words at each instance of one or more adjacent space characters. In another example, punctuation marks can be ignored except for apostrophes, which can be a legitimate part of a POI name or description. In still another example, the universal phrase component 302 can ignore ngrams with so-called "stopwords" listed below in Table 1. This can help eliminate ngrams that likely do not name a point of interest while also reducing processing time. It is to be appreciated that the above are solely for example, and the universal phrase component 302 can evaluate any suitable data (e.g., not ignoring portions of annotation data collected).

TABLE 1

| General | | | | | Streets | Compass Directions |
|---|---|---|---|---|---|---|
| a | down | in | take | we | av | n |
| about | etc | is | than | went | ave | ne |
| after | even | it | that | what | blvd | e |

TABLE 1-continued

| General | | | | | Streets | Compass Directions |
|---|---|---|---|---|---|---|
| also | every | my | the | when | circle | se |
| although | for | new | their | where | court | s |
| an | from | nice | them | who | cr | sw |
| and | get | no | then | will | ct | w |
| any | go | not | there | with | lane | nw |
| are | good | now | they | www | ln | n |
| as | had | of | this | year | st | ne |
| at | has | on | though | yes | | e |
| be | have | or | to | you | | |
| better | her | our | too | your | | |
| between | here | out | took | | | |
| but | him | over | type | | | |
| by | his | part | up | | | |
| can | home | quite | very | | | |
| com | how | see | want | | | |
| could | hr | select | was | | | |
| day | i | so | way | | | |

The universal phrase component 302 can evaluate annotations associated with clusters of nearby locations which can include a suitable name for that part or geographic location. The ngrams described above can be identified as candidate names or descriptions for a POI in the example for the location "South Mercer Playfields play structure."

The annotation aggregator 102 can further include a cluster component 304 that can form candidate clusters. In creating candidate ngrams, the system 300 can cast a wide net and extract possible ngrams, for N=1, 2, 3, etc. from the text annotations. It is to be appreciated that the universal phrase component 302 can ignore or filter out some predefined words and characters to reduce the overall number. In creating candidate clusters, the cluster component 304 can implement a substantially similar philosophy in that many more clusters are generated than are ultimately used. By generating a plurality of clusters, high caliber candidates can be preserved.

The cluster component 304 can identify or find groups of locations with corresponding annotation data. In an example related to leveraging pushpins for a user-defined location corresponding to annotation data, the cluster component 304 can find groups of nearby pushpins. The cluster component 304 can employ a dendrogram in order to identify groups of locations or pushpins. The dendrogram can manifest a hierarchical agglomerative clustering technique. At the beginning, each pushpin or location can be its own cluster. Each subsequent step can merge the two clusters that are nearest in geographical distance to each other. For example, this nearest geographic distance can be based upon latitude/longitude, address, travel distance, GPS data, etc. The cluster component 304 can merge the two nearest clusters in which the new location can be taken as a centroid of their constituent pushpins or locations. At a high level, all the locations or pushpins can be in the substantially same cluster.

It is to be appreciated that the cluster component 304 can leverage the dendrogram, wherein the dendrogram may not provide an indication of an optimal number of clusters (e.g., when to stop merging, etc.). It is to be appreciated that the cluster component 304 can consider any suitable possible cluster grouping.

It is to be appreciated that utilizing the cluster component 304 to cluster pushpins or locations with a dendrogram can be computationally slow based at least in part upon utilizing a distance computation between unique pushpin or location pairs. The cluster component 304 can reduce the computational time by splitting the area for locations into sub-regions (e.g., reducing a 45×45 kilometer region into 4×4 equally sized, square sub-regions). It is to be appreciated that any suitable pre-defined geographic range can be utilized in order to optimize the subject innovation. For example, a pre-defined region can be a subset of a geographic coverage of a particular map or view level of a map. The cluster component 304 can compute a separate dendrogram for each sub-region within the pre-defined geographic distance or range. It is to be appreciated that the while this technique can risk splitting small clusters that span the boundary between two sub-regions, the subject innovation can identify accurate POI names from localized groups of locations or pushpins (e.g., the elimination of large, spanning clusters is a minimal concern, etc.).

Moreover, each cluster of pushpins or locations can include numerous ngrams. Also, an ngram can appear repeatedly in more than one cluster. The cluster component 304 can process distinct ngram/cluster pairs to find ngrams that are appropriate for adding or incorporating to the map. After clustering, the cluster component 304 and/or the universal phrase component 302 can extract ngram/cluster pairs with relevant POI names or descriptions. Toward this end, for each ngram/cluster, the cluster component 304 can compute numerical parameters which can assess whether or not the ngram represents a quality or good caliber point of interest (POI). It is to be appreciated that each cluster can include a latitude/longitude centroid computed from its constituent pushpins or locations (e.g., address, GPS data, etc.). This centroid can be considered a place or location for the ngram on the map upon determination that the centroid is an identified POI.

The cluster component 304 can employ an ngram/cluster parameter such as a "term frequency inverse document frequency" (TFIDF). It is to be appreciated that TFIDF can be used in, for example, document search and retrieval applications. In this particular example, an ngram/cluster can serve as a document. "Term frequency" (TF) can be the number of pushpins or locations in the cluster that contain the ngram. A high TF can be evidence or an indication that the ngram is significant and can be extracted as a POI name. "Document frequency" (DF) can measure how often the ngram appears in the pushpins or locations (e.g., extracted form annotation data), including those outside the cluster. A high DF can indicate that the ngram may not be specific to the cluster in question. TFIDF can be TF/DF, which can be indicative of the ngram's frequency inside the cluster and infrequency outside the cluster. A high TFIDF can be evidence for a quality or high caliber POI name or description. As an example, the monogram "at" occurs very frequently in many clusters, giving it a high DF. Thus, anytime "at" comes up as a candidate ngram in a cluster, its TFIDF will be low. In fact, the list of stopwords in Table 1 can have a high DF, and thus can be filtered or eliminated prior to consideration or evaluation.

The system 300 can further employ additional parameters to identify high caliber or quality POI descriptions or names. As described above, the cluster component 304 can utilize a dendrogram clustering procedure that can grow clusters of pushpins and/or locations without an upper size limit. In one example, the cluster component 304 can keep growing clusters until all the pushpins and/or locations in each sub-region are grouped into one, large cluster. Yet, such large cluster is likely not indicative of a POI, so the cluster component 304 can compute a parameter that identifies clusters where a large fraction of the pushpins mention the POI in question. This parameter utilized by the cluster component 304 can be defined as "term purity," and can be computed as the fraction of pushpins or locations in the cluster that contain the ngram.

The cluster component 304 further utilizes a parameter which is the number of pushpins or locations in the cluster. A lower bound on the number of pushpins or locations tends to eliminate phrases (e.g., phrases that are uninformative, useless, etc.). As an example, a single pushpin or location with a single, unique (e.g., possibly strange or distinct) ngram can qualify as a cluster and can have a high TFIDF (e.g., 1.0) and a high term purity (e.g., 1.0). The threshold on the number of pushpins or locations can help eliminate the strange ngrams that come from pushpins or locations like this.

The three ngram/cluster parameters utilized by the system 300 are described in Table 2. For these parameters, a larger value can be better suited, so a lower threshold is applied to find POI descriptions and/or names.

TABLE 2

| Parameter | Meaning | Range | Lower Threshold |
|---|---|---|---|
| TFIDF | "term frequency, inverse document frequency" assesses the distinctiveness of an ngram inside a cluster compared to everywhere outside the cluster | 0.0-1.0 | 0.8 |
| term purity | fraction of pushpins in cluster that contain ngram | 0.0-1.0 | 0.8 |
| number of pushpins or user-defined locations | number of pushpins or user-defined locations in cluster | ≧1 | 5 |

Figure 4:
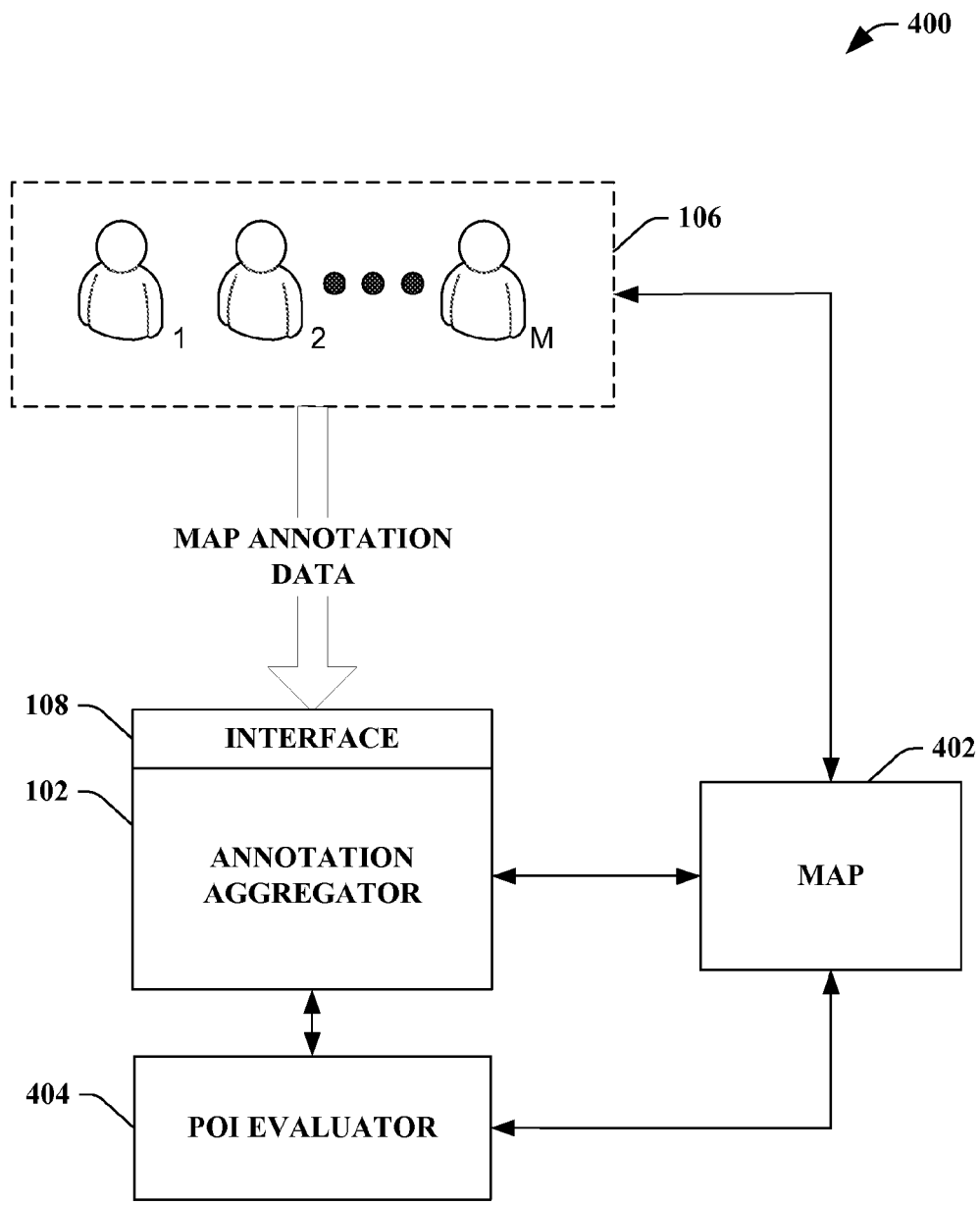
FIG. 4 illustrates a block diagram of an exemplary system that facilitates ranking a point of interest (POI) associated with a map.

FIG. 4 illustrates a system 400 that facilitates ranking a point of interest (POI) associated with a map. The system 400 can include the annotation aggregator 102 that can collect map annotation data via the interface 108 from a plurality of users 106. In particular, the annotation aggregator 102 can evaluate map annotation data targeted to a map 402 in order to identify a point of interest (POI) location not identified on such map 402. It is to be appreciated that the POI can be existing or new. For ranking POI, pushpins can be used to vote on any PIO (e.g., new POI, existing POI, etc.). In other words, the system 400 can populate the map 402 with additional or new locations or POIs in which such locations or POIs are ascertained seamlessly from the users 106. It is to be appreciated that the map annotation data can be gathered from any suitable number of users such as user 1, user 2, to user N, where N is a positive integer.

The system 400 can further include a POI evaluator 404 that can assess an identified and created POI relating to the map 402. In general, a portion of annotation data submitted by a user (e.g., a pushpin, data including a POI name, submission including POI description, etc.) can cast a vote for an existing POI. The POI evaluator 404 can leverage such information in order to decide which POI to display on a map. For example, a map can include limited space or resolution in which a determination can be made on which POIs to display or not display. Moreover, the POI evaluator 404 can provide helpful insight on the popularity of places, locations, etc. (e.g., browsing maps to see what users consider the most interesting places to know about, etc.).

In one example, a data store (e.g., data store 202 in FIG. 2) can include identified locations (e.g., annotation data, pushpin locations, user-supplied pushpins, etc.) as well as bigrams and trigrams. The POI evaluator can compare such bigrams and trigrams with a disparate data store or database (e.g., data store defining business names, locations, places, a directory, a phone book, a business directory, etc.) in order to validate the accuracy or validity of such POI. In other words, the POI evaluator 404 can determine whether the POI truly represents a real world location, business, and/or place. The POI evaluator 404 can utilize each portion of annotation data (e.g., location, pushpin, etc.) that mentioned one of the ngrams as a single vote.

In another instance, high vote-getters can represent chain stores, which are distributed over a region. Such high-vote getters can be filtered or eliminated by the POI evaluator 404 by computing a geometric spread for each ngram. Specifically, the POI evaluator can compute the "median absolute deviation" (MAD) of the voting pushpins' or locations' latitude and longitude. The MAD can be considered a robust estimate of a scalar's variation. The POI evaluator 404 can convert the MAD of the latitude and longitude for each ngram into meters, take the maximum of these two values, and eliminate an ngram whose maximum MAD was greater than a pre-defined distance (e.g., one kilometer, one mile, etc.). By ensuring the maximum MAD is less than a pre-defined distance, resulting POI can be more compact and close in proximity.

Figure 5:
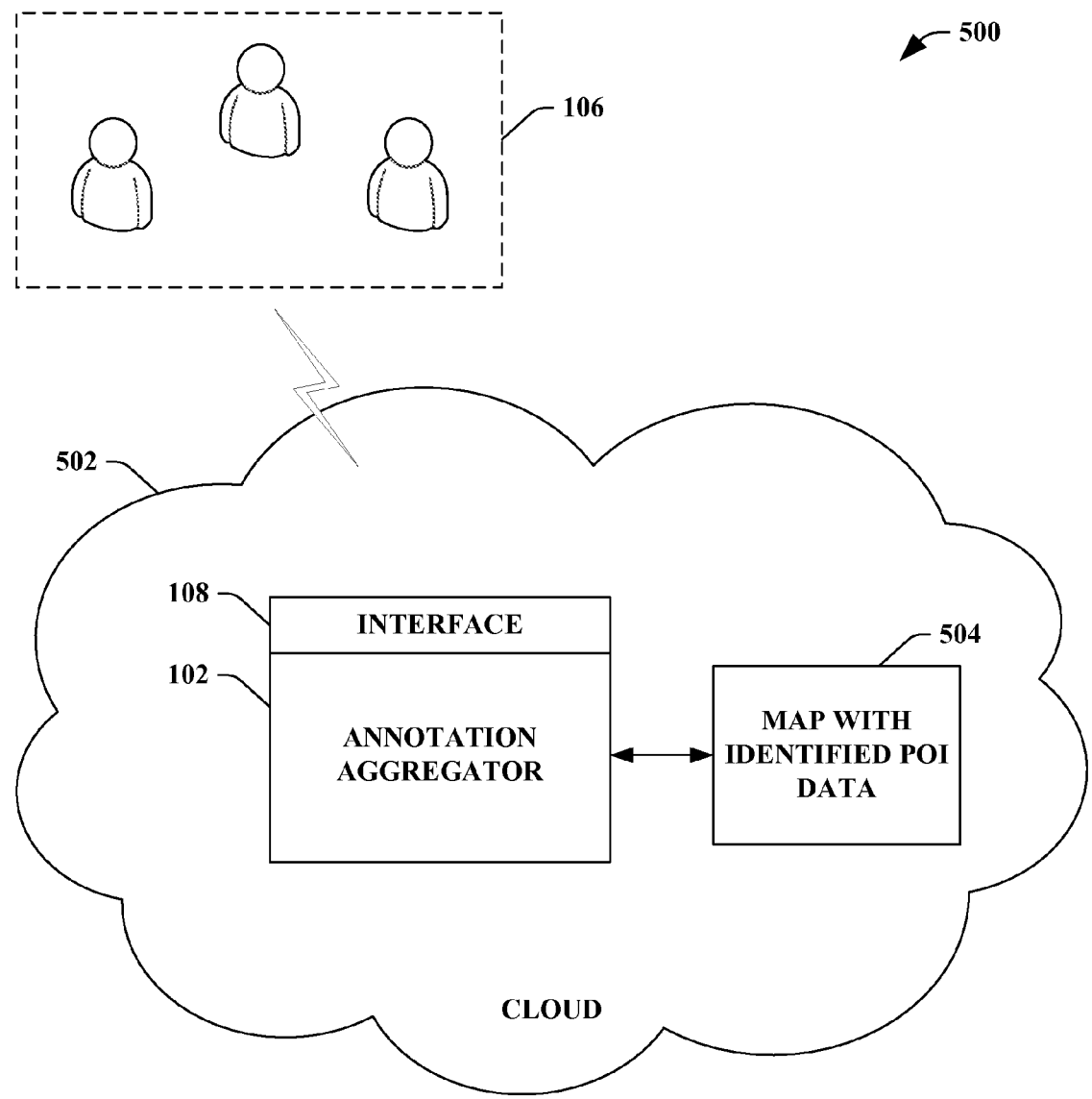
FIG. 5 illustrates a block diagram of exemplary system that facilitates populating a map with a point of interests based upon a collection of user annotations.

FIG. 5 illustrates a system 500 that facilitates populating a map with a point of interests based upon a collection of user annotations. The system 500 can further utilize a cloud 502 that can incorporate at least one of the annotation aggregator 102, the POI (not shown), the interface 108, a map with identified POI data 504, and/or any suitable combination thereof. It is to be appreciated that the cloud 502 can include any suitable component, device, hardware, and/or software associated with the subject innovation. The cloud 502 can refer to any collection of resources (e.g., hardware, software, combination thereof, etc.) that are maintained by a party (e.g., off-site, on-site, third party, etc.) and accessible by an identified user 504 over a network (e.g., Internet, wireless, LAN, cellular, Wi-Fi, WAN, etc.). The cloud 502 is intended to include any service, network service, cloud service, collection of resources, etc. and can be accessed by an identified user via a network. For instance, two or more users (e.g., users 504) can access, join, and/or interact with the cloud 502 and, in turn, at least one of the annotation aggregator 102, the POI (not shown), the interface 108, a map with identified POI data 504, and/or any suitable combination thereof. In addition, the cloud 502 can provide any suitable number of service(s) to any suitable number of user(s) and/or client(s). In particular, the cloud 502 can include resources and/or services that evaluate map annotation data in order to identify a POI to include on a map or digital map. In particular, a user can submit map annotation data to a map hosted by the cloud 502, wherein the cloud 502 can automatically and dynamically evaluate such data in order to extract locations or POIs for the map 504.

Figure 6:
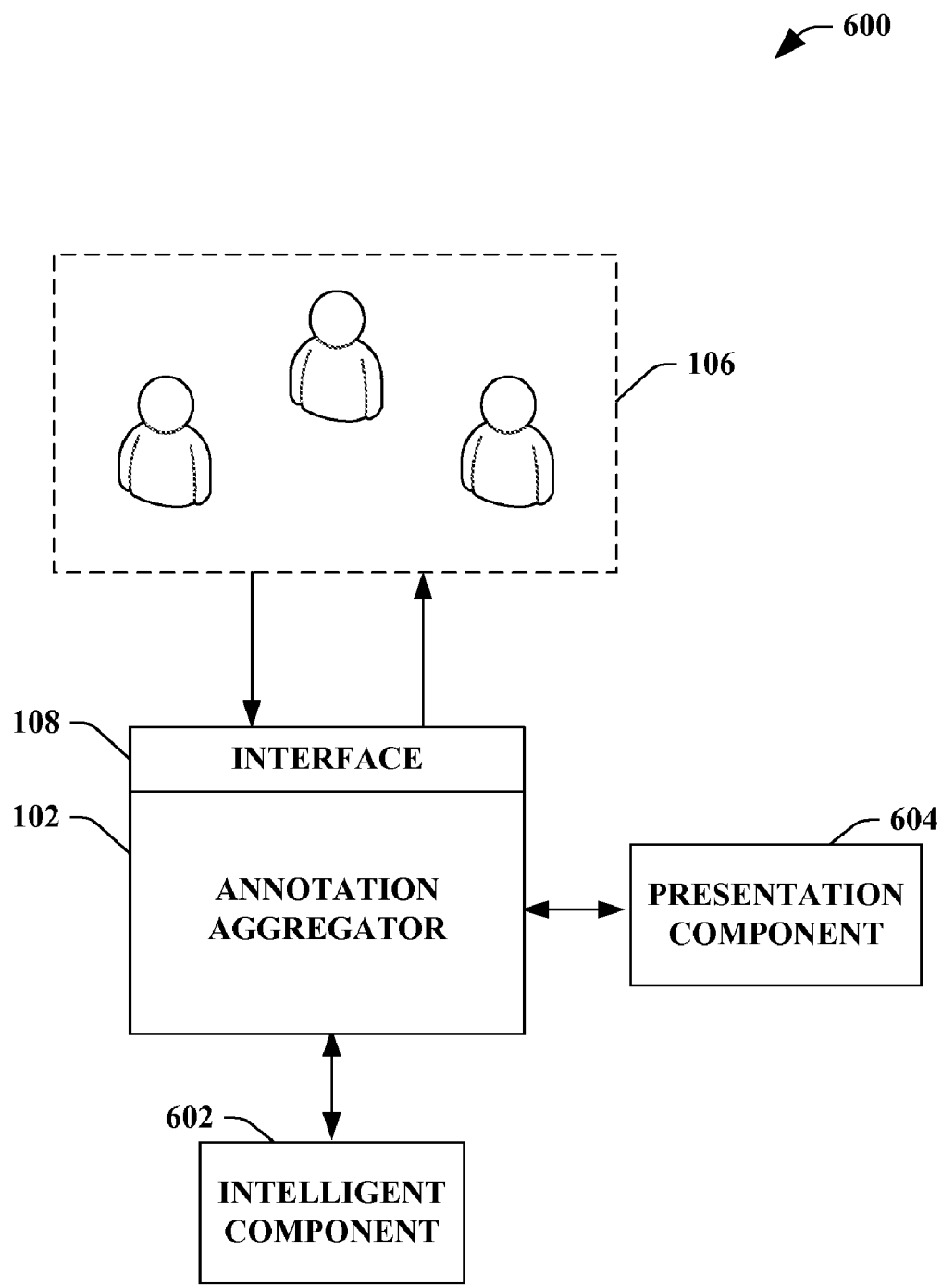
FIG. 6 illustrates a block diagram of an exemplary system that facilitates automatically.

FIG. 6 illustrates a system 600 that employs intelligence to facilitate automatically collecting map annotations from users in order to identify a point of interest (POI). The system 600 can include the annotation aggregator 102, a POI (not shown), two or more users 106, and/or the interface 108, which can be substantially similar to respective aggregators, users, POIs, and interfaces described in previous figures. The system 600 further includes an intelligent component 602. The intelligent component 602 can be utilized by the annotation aggregator 102 to facilitate analyzing map annotation data in order to extrapolate a POI for incorporation with a map or a digital map. For example, the intelligent component 602 can infer POI, POI names, POI description, POI location, POI address, POI popularity, POI assessment evaluation, username, data validity, user authentication, POI phrases, filtering of POI, pushpin data, map information, sub-region definition, pre-defined geographic distance, cluster data, ngrams, dendrograms, TFIDF, term purity, optimal number of user-defined locations or pushpins, etc.

The intelligent component 602 can employ value of information (VOI) computation in order to identify POI, POI descriptions, POI names, POI display hierarchy, and/or POI popularity. For instance, by utilizing VOI computation, the most ideal and/or appropriate POI and respective description can be determined for a particular map or region. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The annotation aggregator 102 can further utilize a presentation component 604 that provides various types of user interfaces to facilitate interaction between a user and any component coupled to the annotation aggregator 102. As depicted, the presentation component 604 is a separate entity that can be utilized with the annotation aggregator 102. However, it is to be appreciated that the presentation component 604 and/or similar view components can be incorporated into the annotation aggregator 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the annotation aggregator 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
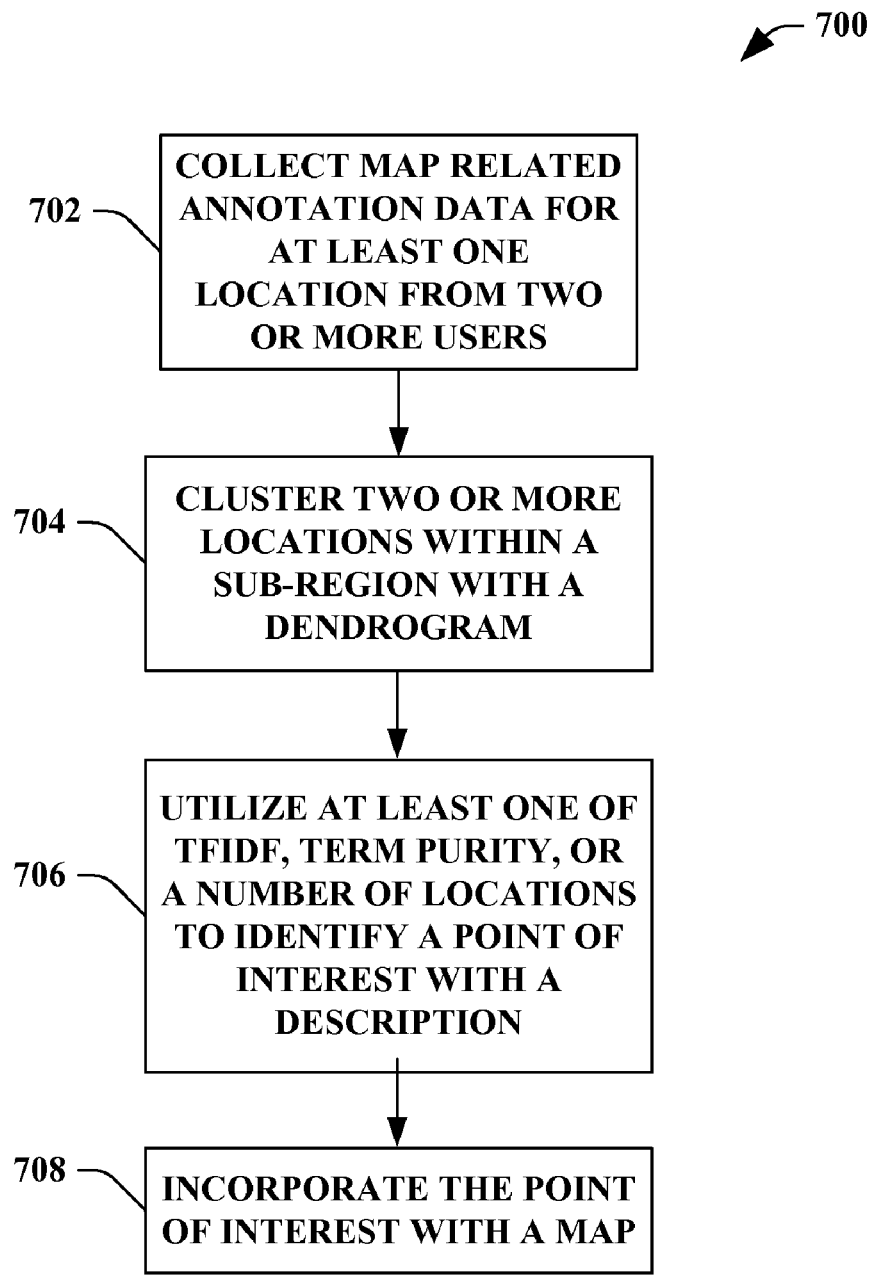
FIG. 7 illustrates an exemplary methodology for identifying a point of interest (POI) not previously identified on a map annotations collected from users.
Figure 8:
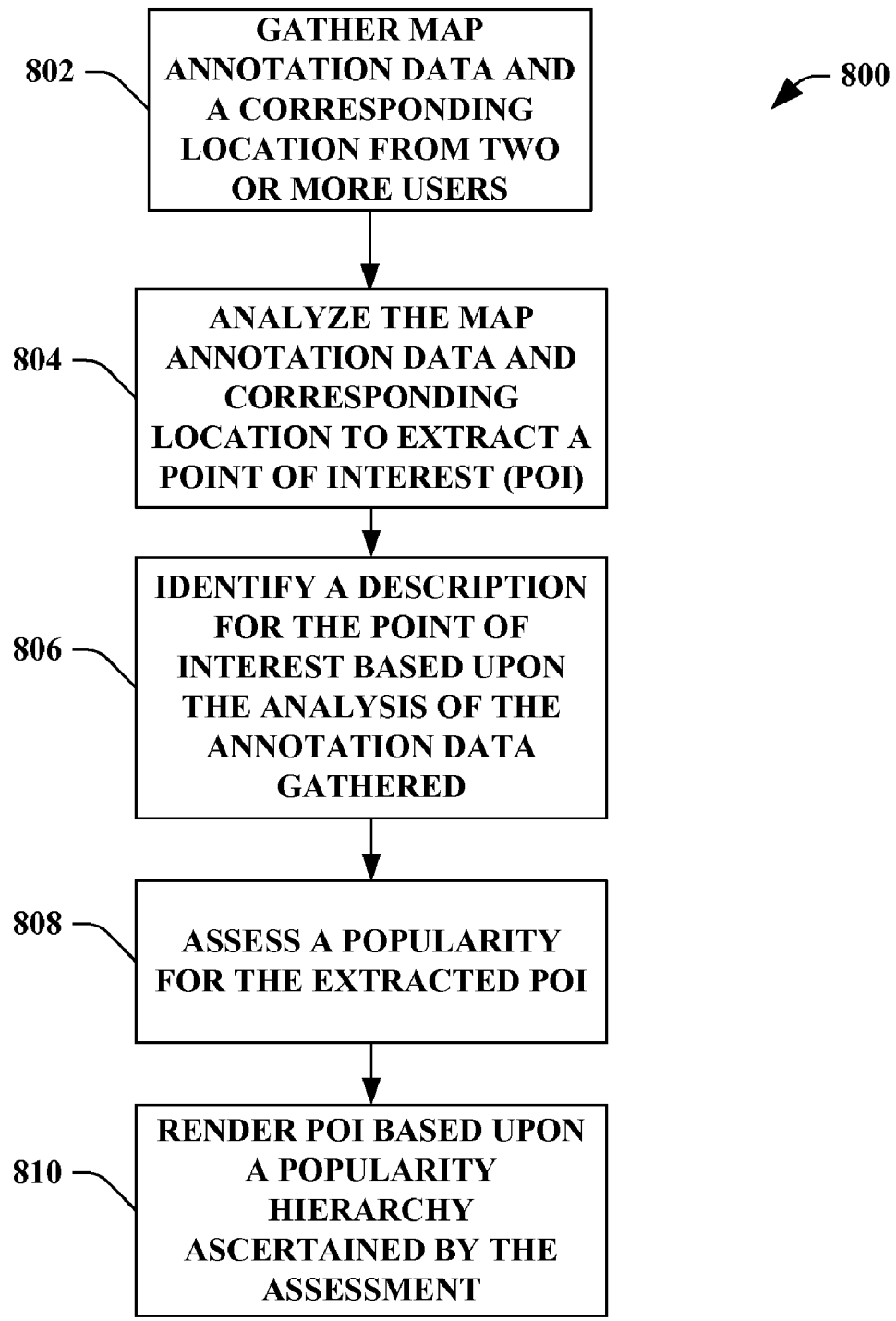
FIG. 8 illustrates an exemplary methodology that facilitates generating a point of interest (POI) with a universal descriptive phrase from map annotations.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates identifying a point of interest (POI) not previously identified on a map annotations collected from users. At reference numeral 702, map related annotation data can be collected for at least one location from two or more users. In particular, the map annotation data can be gathered for a plurality of locations, wherein the annotations can be related to each specific location, address, and/or place. Moreover, the annotation data can be, but is not limited to being, a portion of text, a portion of audio, a portion of video, a portion of a graphic, a portion of handwriting, and/or any other suitable data communication that can be related to a location on a map. For example, a first location can be annotated by a first user and the first location can be annotated by a second user, wherein such annotations for the first location can be gathered.

At reference numeral 704, two or more locations within a sub-region can be clustered with a dendrogram. In particular, a map to which the annotation data is targeted or related can be partitioned into sub-regions in order to facilitate clustering of user-defined locations and corresponding annotations. At reference numeral 706, at least one of term frequency inverse document frequency (TFIDF), term purity, or a number of user-defined locations can be utilized to identify a point of interest (POI). The TFIDF can provide an indication of frequency within a cluster and infrequency outside a cluster, wherein the frequency relates to a phrase, description, or portion of annotation (e.g., also referred to as an ngram). The term purity can identify a cluster with a large fraction of user-defined locations relate to the ngram (e.g., user-defined locations that include ngram). The number of user-defined locations can indicate the frequency or amount of submissions received from the two or more users.

At reference numeral 708, the point of interest (POI) can be incorporated with a map. In particular, the POI can be incorporated, included, overlaid, inserted, etc. with a map, digital, map, mapping software, mapping data, etc. Moreover, the POI can include a phrase, description, or name that provides a description, wherein such data can be extracted based upon analysis of the collected annotation data. In general, the POI can be identified by evaluating the collected user-defined locations and be described by generating a generic label (e.g., name, description, etc.) from the collected annotation data.

FIG. 8 illustrates a method 800 for generating a point of interest (POI) with a universal descriptive phrase from map annotations. At reference numeral 802, map annotation data and a corresponding location can be gathered from two or more users. In general, a plurality of users can provide annotations associated with specific locations. At reference numeral 804, the map annotation data and corresponding location can be analyzed in order to extract a point of interest (POI).

At reference numeral 806, a description for the POI can be identified based upon the analysis of the map annotation data gathered. For example, annotations from users can be filtered, analyzed, and collected in order to identify ngrams for each user-defined location (e.g., a pushpin on a map, etc.). Furthermore, the description can be generated based upon analysis associated with TFIDF, term purity, and/or a number of user's that identify the location (e.g., the amount of users that submit annotation data that relates to a particular location).

At reference numeral 808, a popularity ranking for the extracted POI can be assessed. In particular, the importance of the extracted POI can be ascertained based in part upon a voting technique. It is to be appreciated that the POI can be existing or new. For ranking POI, pushpins can be used to vote on any PIO (e.g., new POI, existing POI, etc.). The POI can be aggregated based upon an amount of users that submit annotation data corresponding to such location. In other words, ngrams (e.g., phrases with "N" amount of words that describe the user-defined location) can be determined, wherein a user-defined location that mentions an ngram can be counted as a vote. Thus, a high number of votes can correlate to a popular POI based upon multiple users submitting annotation data for such locations. At reference numeral 810, POI can be rendered based upon a popularity hierarchy ascertained by the popularity assessment. In other words, a map or portion of a map can include limited real estate or space in which to display POIs. In such a case, the POIs can be rendered in accordance with their population rank.

Figure 9:
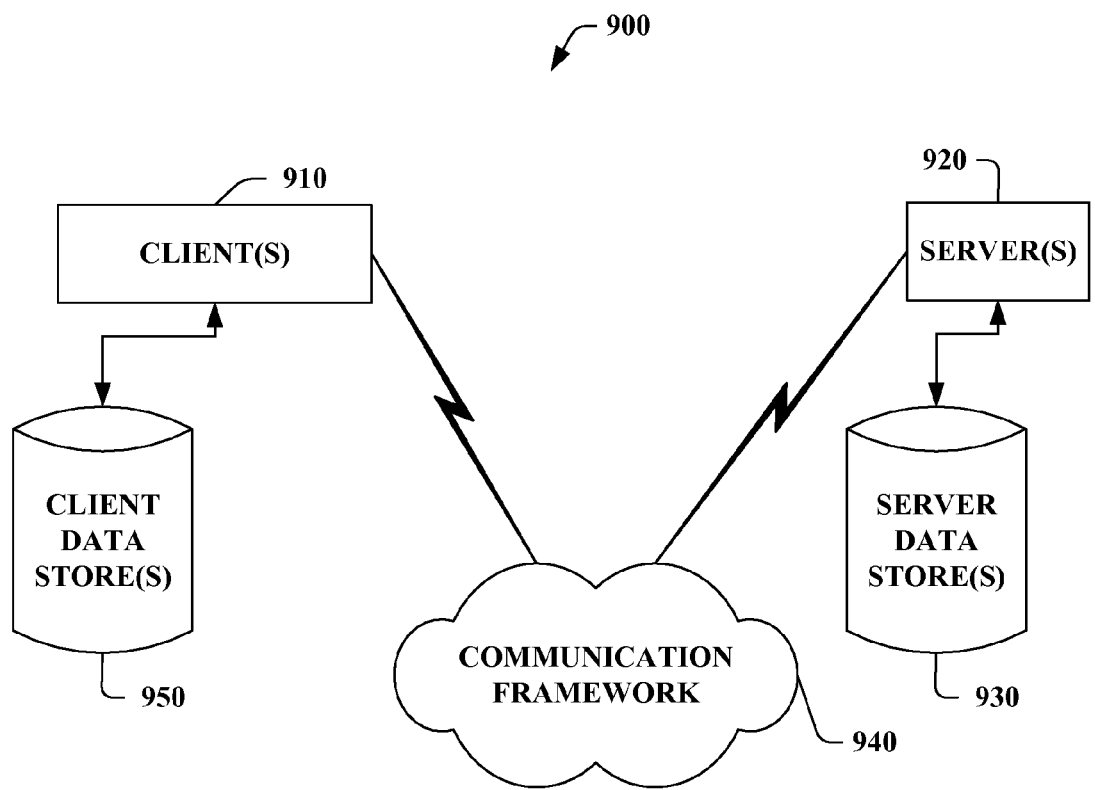
FIG. 9 illustrates an exemplary networking environment, wherein the novel aspects of the claimed subject matter can be employed.
Figure 10:
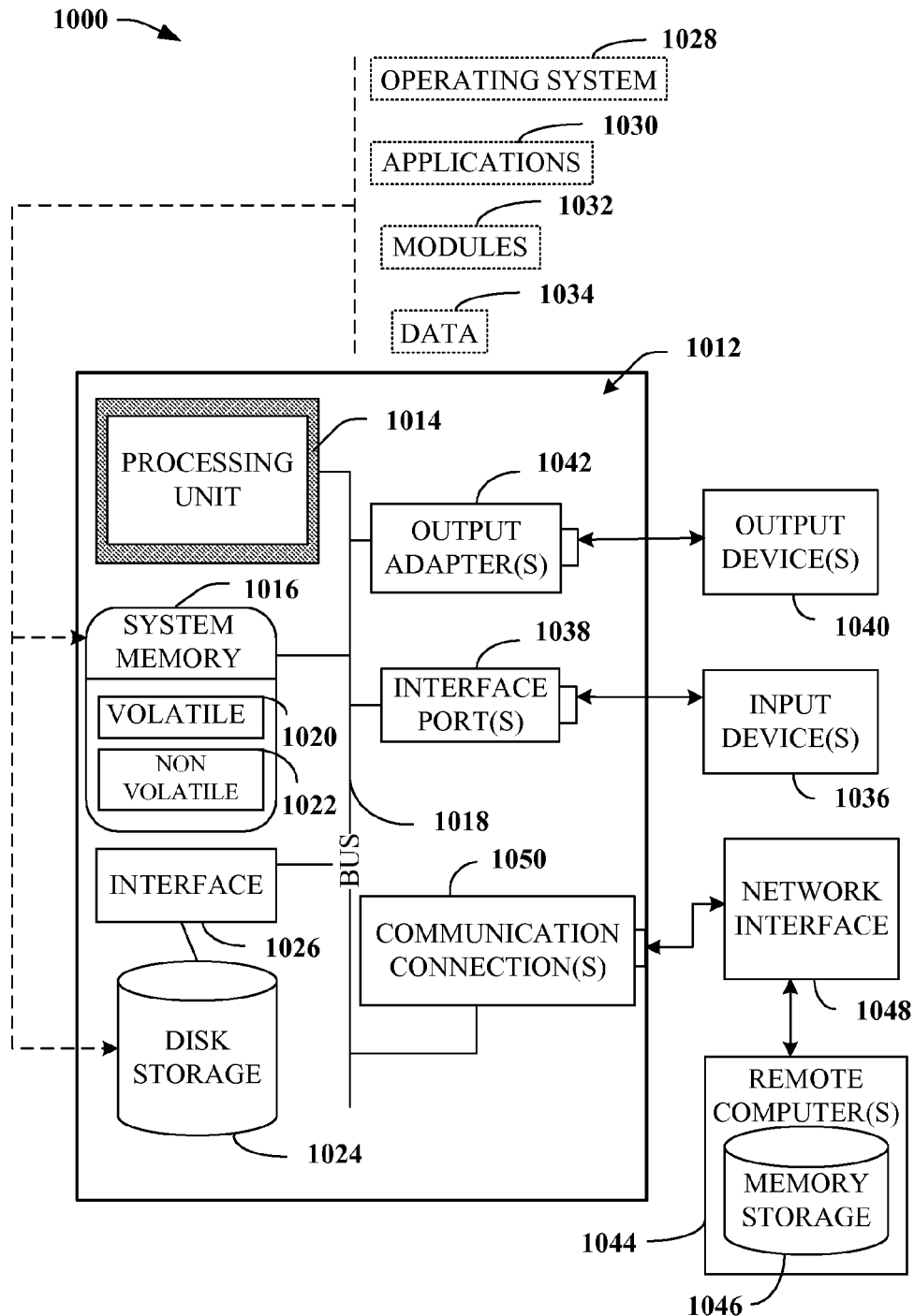
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an annotation aggregator that automatically evaluates map annotation data from a collection of users in order to identify a point of interest (POI) unaffiliated with a map, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising:
   an interface component that, upon execution by a computer, collects a portion of annotation data from two or more users, the portion of annotation data comprising at least one of a geographic location and a user specific description of the geographic location;
   an annotation aggregator that, upon execution by the computer, evaluates annotation data corresponding to the geographic location, creates a point of interest (POI) for the geographic location based upon the evaluation, and associates the geographic location with at least one of an identified location extracted from the two or more users or a universal description extracted from the two or more users; and
   a POI evaluator that, upon execution by the computer, identifies a popularity ranking for at least one of a created POI or an existing POI, the popularity ranking being computed from a number of times the geographic location is submitted by the two or more users.

2. The system of claim 1, wherein the portion of annotation data is at least one of a portion of text, a portion of audio, a portion of video, a portion of a graphic, a portion of handwriting, or a data communication that related to a geographic location.

3. The system of claim 1, wherein the the interface component collects the portion of annotation data from at least one of a network, a website, a blog, a network, a device, a mobile device, a smartphone, a tablet pc, a laptop, a desktop computer, or a wireless device.

4. The system of claim 1, further comprising a universal phrase component that, upon execution by the computer, extracts a description for the POI based upon evaluation of at least one of the geographic location or the user specific description of the geographic location.

5. The system of claim 4, wherein the universal phrase component, upon execution by the computer, extracts an ngram for each geographic location, the ngram being a portion of the annotation data that is a candidate universal description for the POI.

6. The system of claim 5, wherein the universal phrase component, upon execution by the computer, filters out a stopword ngram for the geographic location.

7. The system of claim 6, further comprising a cluster component that, upon execution by the computer, identifies a group of geographic locations within the pre-defined geographic range, the cluster component employs a dendrogram to generate a candidate cluster.

8. The system of claim 7, wherein the cluster component upon execution by the computer, employs a dendrogram for a sub-region of the geography, the geography is partitioned into two or more sub-regions.

9. The system of claim 8, wherein the cluster component, upon execution by the computer, calculates at least one parameter for a pairing of the candidate universal description and the candidate cluster, the calculation facilitates identifying the POI.

10. The system of claim 9, wherein the parameter is a term frequency inverse document frequency (TFIDF) parameter.

11. The system of claim 9, wherein the parameter is a term purity parameter, the term purity parameter is a fraction of geographic locations within the candidate cluster that include the ngram.

12. The system of claim 11, wherein the computer renders two or more POI in accordance with a popularity hierarchy based at least in part upon the identified popularity ranking.

13. The system of claim 9, wherein the parameter is an amount of users that submitted annotation data for the geographic location.

14. The system of claim 1, further comprising a cloud that incorporates at least one of the annotation aggregator, the POI evaluator, or the interface component.

15. The system of claim 14, wherein the cloud is a collection of resources maintained by a party and accessible by an identified user over a network.

16. A computer-implemented method that facilitates maintaining informational integrity of a list of geographic points of interest, the computer-implemented method comprising:
   gathering, by a computer, geographic annotation data and a corresponding location from two or more users;
   analyzing, by the computer, the geographic annotation data and corresponding location to extract a point of interest (POI);
   identifying, by the computer, a description for the POI based upon the analysis of the annotation data gathered;
   assessing, by the computer, a popularity ranking for at least one of the extracted POI or an existing POI;
   rendering, by the computer, the POI based upon a popularity hierarchy ascertained by the assessment;
   extracting, by the computer, an ngram for each location from the geographic annotation data;
   clustering, by the computer, locations within a pre-defined geographic range into a cluster;
   utilizing, by the computer, a dendrogram to cluster the locations; and computing, by the computer, a parameter on a pairing of the ngram and the cluster to identify at least one of the POI or the description for the POI, the parameter being at least one of a term frequency inverse document frequency (TFIDF) parameter, a term purity parameter, or an amount of users that submitted annotation data for the geographic location.

17. A computer-implemented system that facilitates generating a point of interest (POI), the system comprising:

a processor; and a memory in communication with the processor, the memory comprising computer executable instructions which, when executed by the processor, cause the processor to collect a portion of annotation data from two or more users, the portion of annotation data is associated with at least one of a geographic location and a user specific description of the geographic location;

evaluate annotation data corresponding to the geographic location within a pre-defined geographic range;

generate a candidate ngram for the geographic location based upon evaluation of annotation data;

cluster the geographic location within a pre-defined geographic range;

utilize a dendrogram to cluster the geographic locations;

compute a parameter on a pairing of the ngram and the cluster, the parameter being at least one of a term frequency inverse document frequency (TFIDF) parameter, a term purity parameter, or an amount of users that submitted annotation data for the geographic location;

create a point of interest (POI) for the geographic location based upon at least one of the evaluation or the computed parameter;

extract a description for the POI based at least in part upon at least one of the evaluation or the computed parameter;

generate at least one of an identified location extracted from two or more users or a universal description extracted from two or more users;

assess a popularity ranking for at least one of the extracted POI or an existing POI; and render the POI based upon a popularity hierarchy ascertained by the assessment.

\* \* \* \* \*